(12) United States Patent
Bond et al.

(10) Patent No.: US 12,092,816 B2
(45) Date of Patent: Sep. 17, 2024

(54) AUGMENTING ROADWAY MARKINGS AND TRAFFIC SIGNS FOR OCCUPANT AWARENESS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 17/932,356

(22) Filed: Sep. 15, 2022

(65) Prior Publication Data

US 2024/0094530 A1 Mar. 21, 2024

(51) Int. Cl.
| | |
|---|---|
| *G06T 19/00* | (2011.01) |
| *G02B 27/01* | (2006.01) |
| *G06V 20/56* | (2022.01) |
| *G06V 20/58* | (2022.01) |

(52) U.S. Cl.
CPC ............ *G02B 27/01* (2013.01); *G06T 19/006* (2013.01); *G06V 20/582* (2022.01); *G06V 20/588* (2022.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 2010/0253918 A1 | 10/2010 | Seder et al. | |
| 2010/0274473 A1* | 10/2010 | Konishi | G01C 21/3697 |
| | | | 701/532 |
| 2015/0321606 A1* | 11/2015 | Vartanian | G02B 27/0101 |
| | | | 348/148 |
| 2016/0111002 A1* | 4/2016 | Moise | G08G 1/144 |
| | | | 340/932.2 |
| 2017/0212633 A1 | 7/2017 | You et al. | |
| 2020/0242935 A1* | 7/2020 | Nagata | G08G 1/147 |
| 2020/0254877 A1 | 8/2020 | Nakajima et al. | |

(Continued)

FOREIGN PATENT DOCUMENTS

| | | |
|---|---|---|
| DE | 102017130623 A1 | 6/2018 |
| DE | 102017004859 A1 | 3/2019 |

(Continued)

*Primary Examiner* — Tapas Mazumder
(74) *Attorney, Agent, or Firm* — Vivacqua Crane, PLLC

(57) ABSTRACT

A system for providing information to an occupant of a vehicle includes at least one vehicle sensor for determining information about an environment surrounding the vehicle, a display for providing information to the occupant, and a controller in electrical communication with the at least one vehicle sensor and the display. The controller is programmed to identify at least one driving rule associated with at least one portion of the environment surrounding the vehicle using the at least one vehicle sensor, determine an applicability state of the at least one driving rule, where the applicability state includes an applicable state and a non-applicable state, and display a graphic using the display in response to determining that the applicability state of the at least one driving rule is the applicable state.

20 Claims, 5 Drawing Sheets

(56) References Cited

U.S. PATENT DOCUMENTS

| | | | |
|---|---|---|---|
| 2021/0191132 A1 | 6/2021 | Karner et al. | |
| 2021/0360211 A1 | 11/2021 | Kawamura | |
| 2022/0317443 A1* | 10/2022 | Matsui | G06V 20/588 |
| 2023/0135641 A1* | 5/2023 | Miyake | G06V 20/588 |
| | | | 701/36 |

FOREIGN PATENT DOCUMENTS

| | | |
|---|---|---|
| DE | 102020124666 A1 | 3/2021 |
| DE | 102021117850 A1 | 1/2022 |
| WO | 2013088510 A1 | 6/2013 |

* cited by examiner

AUGMENTING ROADWAY MARKINGS AND TRAFFIC SIGNS FOR OCCUPANT AWARENESS

INTRODUCTION

The present disclosure relates to an augmented reality head-up display for displaying information to an occupant of a vehicle.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the occupant's forward field of view. Accordingly, the head-up display provides occupants with information without looking away from the road. One possible implementation for augmented reality is an augmented reality head-up display (AR-HUD) for a vehicle. By overlaying images on the windscreen, AR-HUDs enhance an occupant's view of the environment outside the vehicle, creating a greater sense of environmental awareness. Enhanced environmental awareness may be especially important for occupants having a disability such as, for example, color-vision impairment.

Therefore, while current augmented reality head-up displays achieve their intended purpose, there is a need in the art for an improved approach for providing information to vehicle occupants.

SUMMARY

According to several aspects, a system for providing information to an occupant of a vehicle is provided. The system includes at least one vehicle sensor for determining information about an environment surrounding the vehicle, a display for providing information to the occupant, and a controller in electrical communication with the at least one vehicle sensor and the display. The controller is programmed to identify at least one driving rule associated with at least one portion of the environment surrounding the vehicle using the at least one vehicle sensor, determine an applicability state of the at least one driving rule, where the applicability state includes an applicable state and a non-applicable state, and display a graphic using the display in response to determining that the applicability state of the at least one driving rule is the applicable state.

In another aspect of the present disclosure, the at least one vehicle sensor further may include a camera for capturing images of the environment surrounding the vehicle. To identify the at least one driving rule associated with the at least one portion of the environment surrounding the vehicle the controller is further programmed to capture an image of the environment surrounding the vehicle using the camera and analyze the image to identify the at least one driving rule associated with the at least one portion of the environment surrounding the vehicle.

In another aspect of the present disclosure, to analyze the image, the controller is further programmed to identify at least one traffic sign in the image, identify at least one pavement marking in the image, and identify the at least one driving rule based on at least one of the at least one traffic sign and the at least one pavement marking.

In another aspect of the present disclosure, to determine the applicability state of the at least one driving rule, the controller is further programmed to identify an applicability time-window based on at least one of the at least one traffic sign and the at least one pavement marking. To determine the applicability state of the at least one driving rule, the controller is further programmed to determine a current date and time and compare the current date and time to the applicability time-window. To determine the applicability state of the at least one driving rule, the controller is further programmed to determine the applicability state of the at least one driving rule to be the applicable state in response to determining that the current time is within the applicability time-window.

In another aspect of the present disclosure, to determine the applicability state of the at least one driving rule, the controller is further programmed to identify at least one applicability restriction based on least one of the at least one traffic sign and the at least one pavement marking. To determine the applicability state of the at least one driving rule, the controller is further programmed to determine a plurality of occupant and vehicle characteristics and compare the plurality of occupant and vehicle characteristics with the at least one applicability restriction. To determine the applicability state of the at least one driving rule, the controller is further programmed to determine the applicability state of the at least one driving rule to be the applicable state in response to determining that at least one of the plurality of occupant and vehicle characteristics is substantially similar to the at least one applicability restriction.

In another aspect of the present disclosure, the at least one vehicle sensor further may include a vehicle communication system. To identify the at least one driving rule associated with the at least one portion of the environment surrounding the vehicle the controller is further programmed to receive a first signal transmitted by an infrastructure device in the environment surrounding the vehicle using the vehicle communication system, where the first signal includes information about the at least one driving rule and identify the at least one driving rule based on the first signal.

In another aspect of the present disclosure, the at least one vehicle sensor further may include a global positioning system (GPS). To identify the at least one driving rule associated with the at least one portion of the environment surrounding the vehicle the controller is further programmed to determine a location of the vehicle using the GPS and transmit the location of the vehicle to a remote system using the vehicle communication system. To identify the at least one driving rule associated with the at least one portion of the environment surrounding the vehicle the controller is further programmed to receive a second signal transmitted by the remote system using the vehicle communication system, where the second signal includes information about the at least one driving rule. To identify the at least one driving rule associated with the at least one portion of the environment surrounding the vehicle the controller is further programmed to identify the at least one driving rule based on the second signal.

In another aspect of the present disclosure, at least one of the first signal and the second signal further includes an applicability time-window and at least one applicability restriction of the at least one driving rule. To determine the applicability state of the at least one driving rule, the controller is further programmed to identify the applicability time-window based at least one of the first signal and the second signal and identify the at least one applicability restriction based on at least one of the first signal and the second signal. To determine the applicability state of the at least one driving rule, the controller is further programmed to determine a current date and time and compare the current date and time to the applicability time-window. To determine the applicability state of the at least one driving rule, the controller is further programmed to determine a plurality of occupant and vehicle characteristics and compare the plurality of occupant and vehicle characteristics with the at least one applicability restriction. To determine the applicability state of the at least one driving rule, the controller is further programmed to determine the applicability state of the at least one driving rule to be the applicable state in response to determining that the current time is within the applicability time-window and that at least one of the plurality of occupant and vehicle characteristics is substantially similar to the at least one applicability restriction.

In another aspect of the present disclosure, the display is an augmented reality head-up display (AR-HUD) system in electronic communication with the controller, where the AR-HUD system includes an occupant position tracking device and an AR-HUD projector, and where to display the graphic the controller is further programmed to determine a position of an occupant of the vehicle using the occupant position tracking device, calculate a size, shape, and location of the graphic based on the position of the occupant and an image of the environment, and display the graphic including information about the at least one driving rule on a windscreen of the vehicle using the AR-HUD system based on the size, shape, and location of the graphic.

In another aspect of the present disclosure, the display further includes a transparent windscreen display (TWD) system in electronic communication with the controller, where the TWD system includes transparent phosphors embedded in the windscreen of the vehicle and a TWD projector, and where to display the graphic the controller is further programmed to calculate a size, shape, and location of the graphic based on an image of the environment and display the graphic including information about the at least one driving rule on the windscreen of the vehicle using the TWD system based on the size, shape, and location of the graphic.

According to several aspects, a method for providing information to an occupant of a vehicle is provided. The method includes identifying at least one driving rule associated with an environment surrounding the vehicle using at least one vehicle sensor. The method further includes determining an applicability state of the at least one driving rule, where the applicability state includes an applicable state and a non-applicable state. The method further includes displaying a graphic using a display in response to determining that the applicability state of the at least one driving rule is the applicable state.

In another aspect of the present disclosure, at least one vehicle sensor is a camera, and identifying the at least one driving rule further may include capturing an image of the environment surrounding the vehicle using the camera, identifying at least one traffic sign in the image, and identifying at least one pavement marking in the image. Identifying the at least one driving rule further includes identifying the at least one driving rule based on at least one of the at least one traffic sign and the at least one pavement marking.

In another aspect of the present disclosure, determining the applicability state of the at least one driving rule further may include identifying an applicability time-window based on at least one of the at least one traffic sign and the at least one pavement marking. Determining the applicability state of the at least one driving rule further may include identifying at least one applicability restriction based on at least one of: the at least one traffic sign and the at least one pavement marking. Determining the applicability state of the at least one driving rule further may include determining a current date and time, comparing the current date and time to the applicability time-window, determining a plurality of occupant and vehicle characteristics, and comparing the plurality of occupant and vehicle characteristics with the at least one applicability restriction. Determining the applicability state of the at least one driving rule further may include determining the applicability state of the at least one driving rule to be the applicable state in response to determining that the current time is within the applicability time-window and that at least one of the plurality of occupant and vehicle characteristics is substantially similar to the at least one applicability restriction.

In another aspect of the present disclosure, the at least one vehicle sensor is a vehicle communication system, and identifying the at least one driving rule further may include receiving a first signal transmitted by an infrastructure device in the environment surrounding the vehicle using the vehicle communication system, where the first signal includes information about the at least one driving rule. Identifying the at least one driving rule further may include identifying the at least one driving rule based on the first signal.

In another aspect of the present disclosure, the at least one vehicle sensor further may include a global positioning system (GPS), and identifying the at least one driving rule further may include determining a location of the vehicle using the GPS and transmitting the location of the vehicle to a remote system using the vehicle communication system. Identifying the at least one driving rule further may include receiving a second signal transmitted by the remote system using the vehicle communication system, where the second signal includes information about the at least one driving rule and identifying the at least one driving rule based on the second signal.

In another aspect of the present disclosure, the at least one of the first signal and the second signal further includes an applicability time-window and at least one applicability restriction of the at least one driving rule and determining the applicability state of the at least one driving rule further may include identifying an applicability time-window based at least one of the first signal and the second signal. Determining the applicability state of the at least one driving rule further may include identifying at least one applicability restriction based on at least one of the first signal and the second signal. Determining the applicability state of the at least one driving rule further may include determining a current date and time, comparing the current date and time to the applicability time-window, determining a plurality of occupant and vehicle characteristics, and comparing the plurality of occupant and vehicle characteristics with the at least one applicability restriction. Determining the applicability state of the at least one driving rule further may include determining the applicability state of the at least one driving rule to be the applicable state in response to determining that the current time is within the applicability time-window and that at least one of the plurality of occupant and vehicle characteristics is substantially similar to the at least one applicability restriction.

In another aspect of the present disclosure, the display is an augmented reality head-up display (AR-HUD) system, where the AR-HUD system includes an occupant position tracking device and an AR-HUD projector, and displaying the graphic further comprises determining a position of an occupant of the vehicle using the occupant position tracking device, calculating a size, shape, and location of the graphic based on the position of the occupant and an image of the environment, and displaying the graphic including information about the at least one driving rule on a windscreen of the vehicle using the AR-HUD system based on the size, shape, and location of the graphic.

According to several aspects, a system for providing information to an occupant of a vehicle a plurality of vehicle sensors is provided. The system includes a camera for capturing images of an environment surrounding the vehicle, a vehicle communication system for communicating with systems external to the vehicle, and a global positioning system (GPS) for determining a geographical location of the vehicle. The system also includes a display including an augmented reality head-up display (AR-HUD) system and a transparent windscreen display (TWD) system. The system also includes a controller in electrical communication with the plurality of vehicle sensors and the display, where the controller is programmed to identify at least one driving rule associated with at least one portion of the environment surrounding the vehicle using the at least one vehicle sensor, determine an applicability state of the at least one driving rule, where the applicability state includes an applicable state and a non-applicable state, and display a graphic using the display in response to determining that the applicability state of the at least one driving rule is the applicable state.

In another aspect of the present disclosure, to identify the at least one driving rule, the controller is further programmed to capture an image of the environment surrounding the vehicle using the camera, identify at least one traffic sign in the image, identify at least one pavement marking in the image, and identify the at least one driving rule based on at least one of: the at least one traffic sign and the at least one pavement marking. To determine the applicability state of the at least one driving rule, the controller is further programmed to identify an applicability time-window based on at least one of the at least one traffic sign and the at least one pavement marking and identify at least one applicability restriction based on at least one of the at least one traffic sign and the at least one pavement marking. To determine the applicability state of the at least one driving rule, the controller is further programmed to determine a current date and time, compare the current date and time to the applicability time-window, and determine a plurality of occupant and vehicle characteristics. To determine the applicability state of the at least one driving rule, the controller is further programmed to compare the plurality of occupant and vehicle characteristics with the at least one applicability restriction. To determine the applicability state of the at least one driving rule, the controller is further programmed to determine the applicability state of the at least one driving rule to be the applicable state in response to determining that the current time is within the applicability time-window and that at least one of the plurality of occupant and vehicle characteristics is substantially similar to the at least one applicability restriction.

In another aspect of the present disclosure, to identify the at least one driving rule, the controller is further programmed to determine a location of the vehicle using the GPS, transmit the location of the vehicle to a remote system using the vehicle communication system, and receive a signal transmitted by the remote system using the vehicle communication system, wherein the second signal includes information about the at least one driving rule. To identify the at least one driving rule, the controller is further programmed to identify the at least one driving rule based on the second signal. To determine the applicability state of the at least one driving rule, the controller is further pro-grammed to identify an applicability time-window based on the signal, identify at least one applicability restriction based on the signal, determine a current date and time, and compare the current date and time to the applicability time-window. To determine the applicability state of the at least one driving rule, the controller is further programmed to determine a plurality of occupant and vehicle characteristics and compare the plurality of occupant and vehicle characteristics with the at least one applicability restriction. To determine the applicability state of the at least one driving rule, the controller is further programmed to determine the applicability state of the at least one driving rule to be the applicable state in response to determining that the current time is within the applicability time-window and that at least one of the plurality of occupant and vehicle characteristics is substantially similar to the at least one applicability restriction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
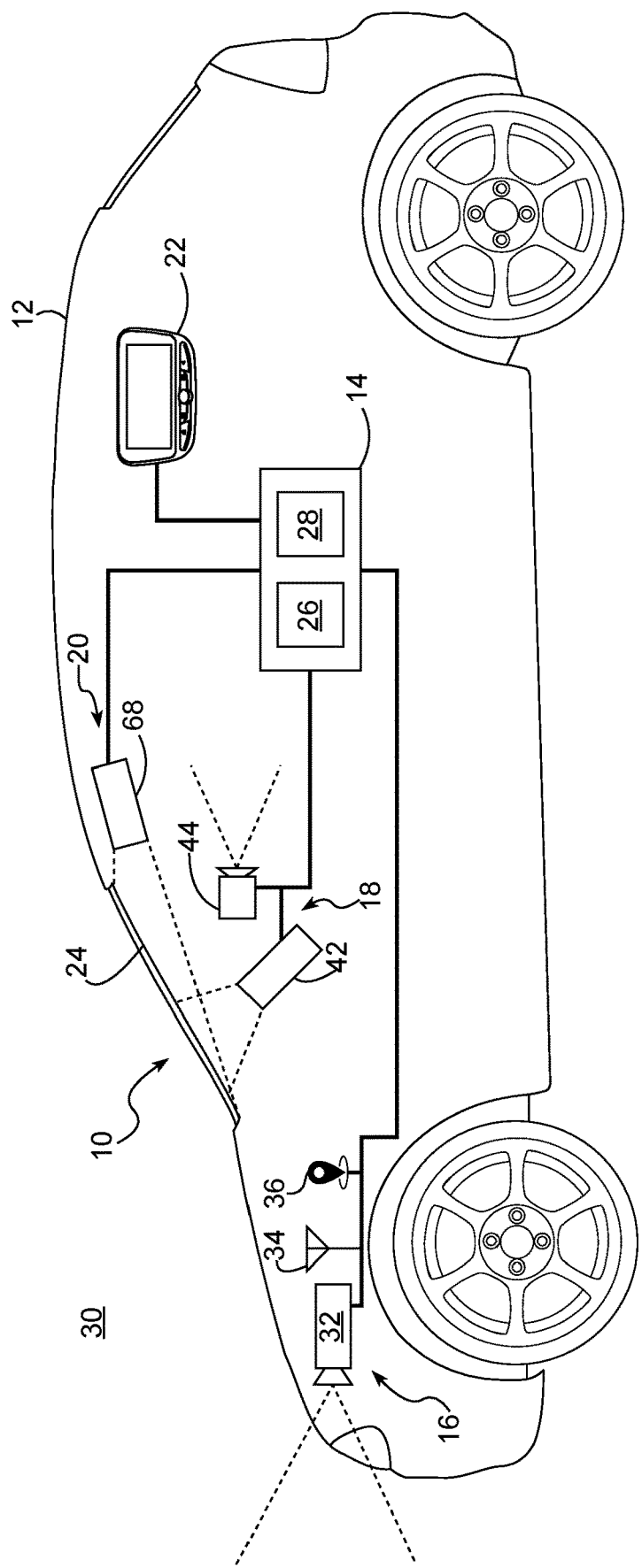
FIG. 1 is a schematic diagram of a system for providing information to an occupant of a vehicle according to an exemplary embodiment.

Referring to FIG. 1, a system for providing information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, vehicle sensors 16, an augmented reality head-up display (AR-HUD) system 18, a transparent windscreen display (TWD) system 20, and a human-machine interface (HMI) 22.

The controller 14 is used to implement a method 100 for providing information to an occupant of a vehicle, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or nonvolatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the vehicle sensors 16, the AR-HUD system 18, the TWD system 20, and the HMI 22. The electrical communication may be established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensors 16 are used to acquire information about an environment 30 surrounding the vehicle 12. In an exemplary embodiment, the vehicle sensors 16 include a camera 32, a vehicle communication system 34, and a global positioning system (GPS) 36. It should be understood that the vehicle sensors 16 may include additional sensors for determining characteristics of the vehicle 12, for example, vehicle speed, roadway curvature, and/or vehicle steering without departing from the scope of the present disclosure. The vehicle sensors 16 are in electrical communication with the controller 14 as discussed above.

The camera 32 is used to capture images and/or videos of the environment 30 surrounding the vehicle 12. In an exemplary embodiment, the camera 32 is a photo and/or video camera which is positioned to view the environment 30 in front of the vehicle 12. In one example, the camera 32 is affixed inside of the vehicle 12, for example, in a headliner of the vehicle 12, having a view through a windscreen 24 of the vehicle 12. In another example, the camera 32 is affixed outside of the vehicle 12, for example, on a roof of the vehicle 12, having a view of the environment 30 in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 34 is used by the controller 14 to communicate with other systems external to the vehicle 12. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In certain embodiments, the vehicle communication system 34 is a wireless communication system configured to communicate via a wireless local area network (WLAN) using IEEE 802.11 standards or by using cellular data communication. However, additional, or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles.

The GPS 36 is used to determine a geographical location of the vehicle 12. In an exemplary embodiment, the GPS 36 includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, including additional types of global navigation satellite systems (GNSS) are within the scope of the present disclosure.

Figure 2:
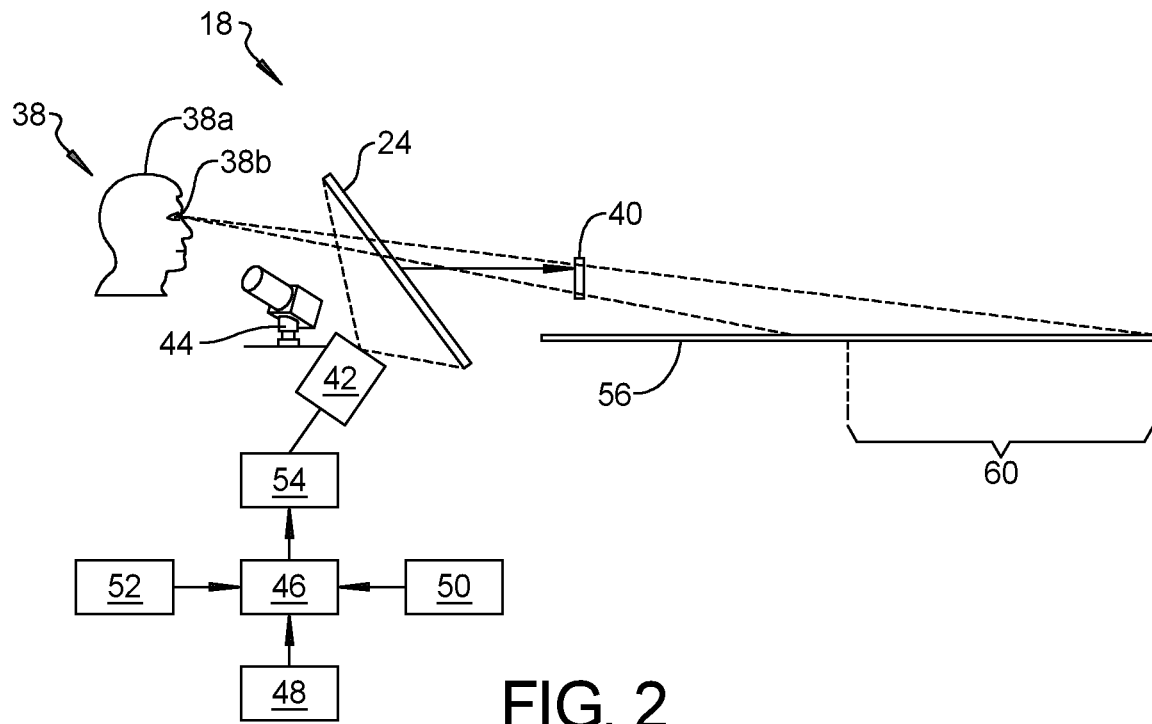
FIG. 2 is a schematic diagram of an AR-HUD system for use by an exemplary occupant according to an exemplary embodiment.

Referring to FIG. 2, a system diagram of the AR-HUD system 18 for use by an exemplary occupant 38 is shown. In the scope of the present disclosure, the occupant includes, in a non-limiting example, a driver, a passenger, and/or any additional persons in the vehicle 12. The AR-HUD system 18 is used to display AR-HUD graphics 40 (i.e., notification symbols providing visual information to the occupant 38) on the windscreen 24 of the vehicle 12. The AR-HUD system 18 includes an AR-HUD projector 42 and an occupant position tracking device 44. The AR-HUD system 18 is in electrical communication with the controller 14 as discussed above.

The AR-HUD projector 42 is used to project the AR-HUD graphics 40 on the windscreen 24 of the vehicle 12. It should be understood that various devices designed to project images including, for example, optical collimators, laser projectors, digital light projectors (DLP), and the like are within the scope of the present disclosure.

The occupant position tracking device 44 is used to determine a position of the occupant 38 in the vehicle 12.

For example, the occupant position tracking device 44 may track a position of a head 38a or eyes 38b of the occupant 38. The position of the occupant 38 in the vehicle 12 from the occupant position tracking device 44 is used to locate the AR-HUD graphic 40 on a windscreen 24 of the vehicle 12. In an exemplary embodiment, the occupant position tracking device 44 is one or more cameras disposed in the vehicle 12.

To operate the AR-HUD system 18, the controller 14 includes multiple software modules, including a system manager 46. During operation of the system 10, the system manager 46 receives at least a first input 48, a second input 50, and a third input 52. The first input 48 is indicative of the location of the vehicle 12 in space (i.e., the geographical location of the vehicle 12), the second input 50 is indicative of the vehicle occupant 38 position in the vehicle 12 (e.g., the position of the eyes and/or head of the occupant 38 in the vehicle 12), and the third input 52 is data pertaining to a driving rule in the environment 30 surrounding the vehicle 12, as will be discussed in greater detail below. The first input 48 may include data such as GNSS data (e.g., GPS data), vehicle speed, roadway curvature, and vehicle steering, and this data is collected from the vehicle sensors 16. The second input 50 is received from the occupant position tracking device 44. The third input 52 is data pertaining to the driving rule in the environment 30 surrounding the vehicle 12. The system manager 46 is configured to determine (e.g., compute) the type, size, shape, and color of the AR-HUD graphics 40 to be displayed using the AR-HUD projector 42 based on the first input 48 (i.e., the vehicle location in the environment 30), the second input 50 (e.g., the position of the eyes 38b and/or head 38a of the occupant 38 in the vehicle 12), and the third input 52 (i.e. the driving rule in the environment 30 surrounding the vehicle 12) The system manager 46 instructs an image engine 54, which is a software module or an integrated circuit of the AR-HUD projector 42 or the controller 14, to display the AR-HUD graphic 40 using the AR-HUD projector 42. The image engine 54 displays the AR-HUD graphic 40 on the windscreen 24 of the vehicle 12 using the AR-HUD projector 42 based on the type, size, shape, and color of the AR-HUD graphic 40 determined by the system manager 46. The AR-HUD graphic 40 is projected on the windscreen 24 by the AR-HUD projector 42 to show the AR-HUD graphic 40 along a roadway surface 56.

Figure 3:
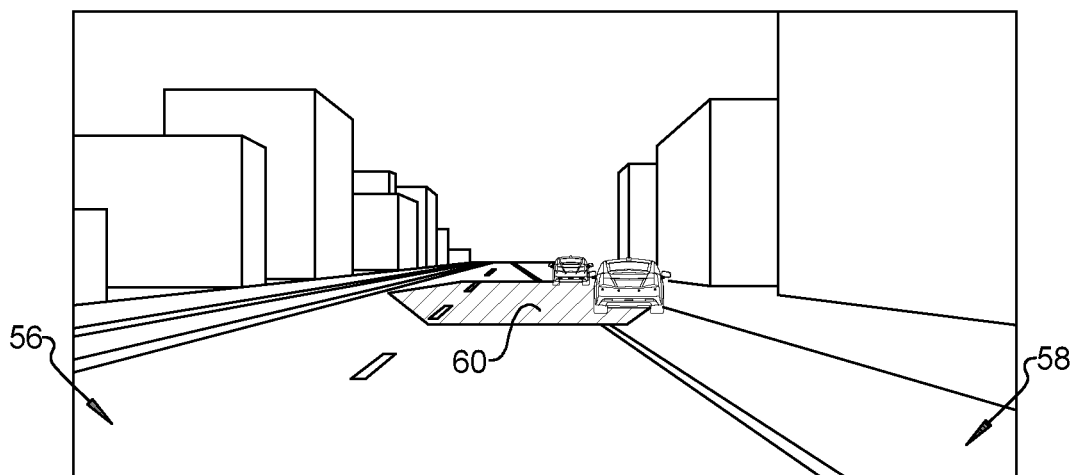
FIG. 3 is a schematic front view of a dual-focal plane augmented reality display, highlighting a second image plane of the dual-focal plane augmented reality display according to an exemplary embodiment.
Figure 4:
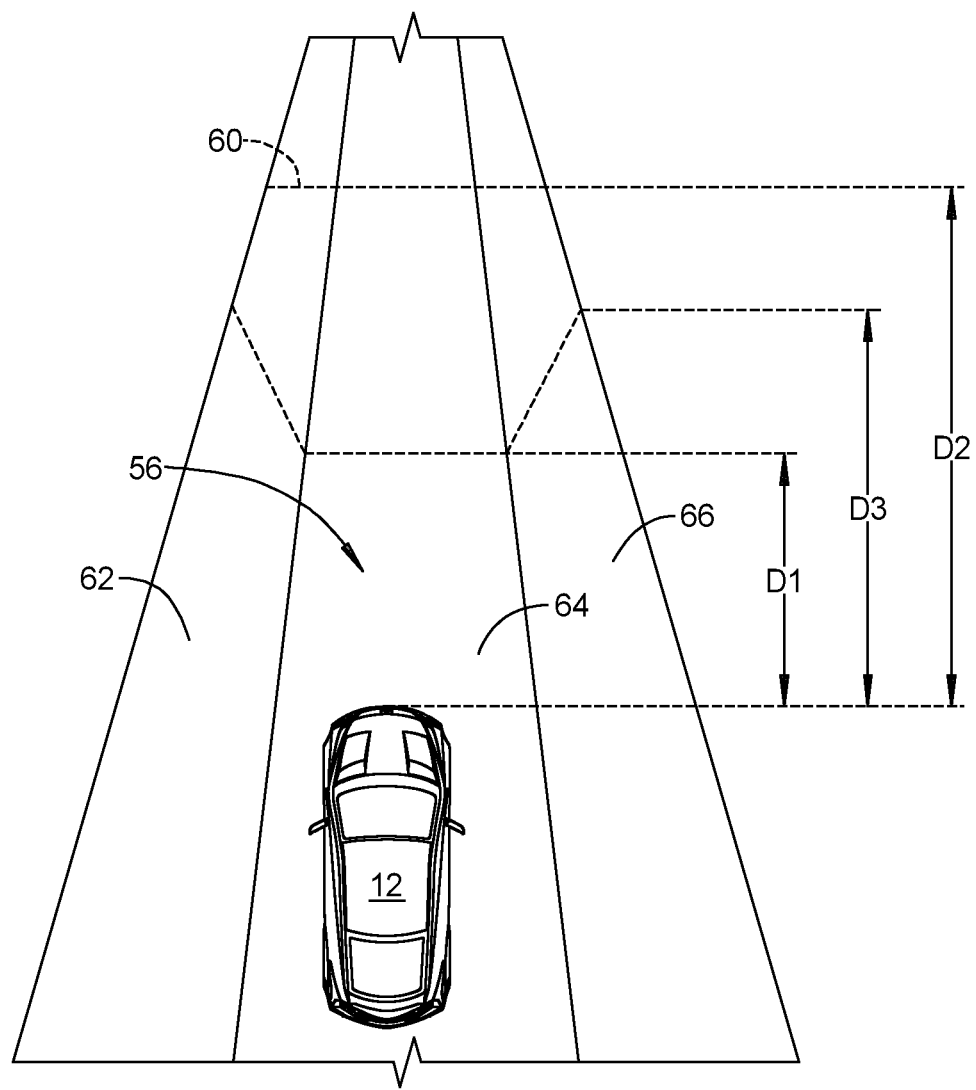
FIG. 4 is a schematic diagram of the second image plane of the dual-focal plane augmented according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 58 and a second image plane 60. The first image plane 58 shows the view of the outside world, and the second image plane 60 is reserved for displaying the AR-HUD graphics 40. The second image plane 60 spans multiple lanes and the AR-HUD graphics 40 appear at a location farther on a roadway surface 56 relative to the first image plane 58. For instance, as shown in FIGS. 3 and 4, the second image plane 60 covers a left lane 62, a central lane 64, and a right lane 66. As a non-limiting example, in the central lane 64, the second image plane 60 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 38 see the AR-HUD graphics 40 displayed using the AR-HUD projector 42. In the left lane 62 and the right lane 66, the second image plane 60 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 38 see the AR-HUD graphics 40 displayed using the AR-HUD projector 42. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 40 on the view of the outside word. For instance, by using a dual-focal plane AR-HUD, the size, location, and characteristics of the AR-HUD graphics 40 may be changed based on, for example, the location of the eyes 38b of the occupant 38.

The TWD system 20 is used to display images on the windscreen 24 of the vehicle 12. In an exemplary embodiment, the AR-HUD system 18 can display the AR-HUD graphics 40 in a predefined region of the windscreen 24 (e.g., in the first image plane 58 and the second image plane 60). The TWD system 20 can display TWD graphics (not shown) in any region of the windscreen 24. Therefore, by operating the AR-HUD system 18 and the TWD system 20 in conjunction, the controller 14 may display graphics in any region of the windscreen 24. In an exemplary embodiment, the TWD system 20 includes transparent phosphors (not shown) embedded into the windscreen 24 and a TWD projector 68 (FIG. 1). The TWD system 20 is in electrical communication with the controller 14 as discussed above.

The transparent phosphors are light emitting particles which fluoresce in response to being excited by the TWD projector 68. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light. The TWD projector 68 is used to excite the transparent phosphors in a predetermined pattern to produce the TWD graphics on the windscreen 24. In an exemplary embodiment, the TWD projector 68 is a violet/ultraviolet laser projector disposed proximally to the headliner of the vehicle 12. The TWD projector 68 includes three lasers, each laser configured to excite one of the red, green, or blue transparent phosphors.

In an exemplary embodiment, the HMI 22 is used in addition to the AR-HUD system 18 and the TWD system 20 to display information to the occupant 38 of the vehicle 12. In another exemplary embodiment, the HMI 22 is used instead of the AR-HUD system 18 and/or the TWD system 20 to display information to the occupant 38 of the vehicle 12. In the aforementioned exemplary embodiments, the HMI 22 is a display system located in view of the occupant 38 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

Figure 5:
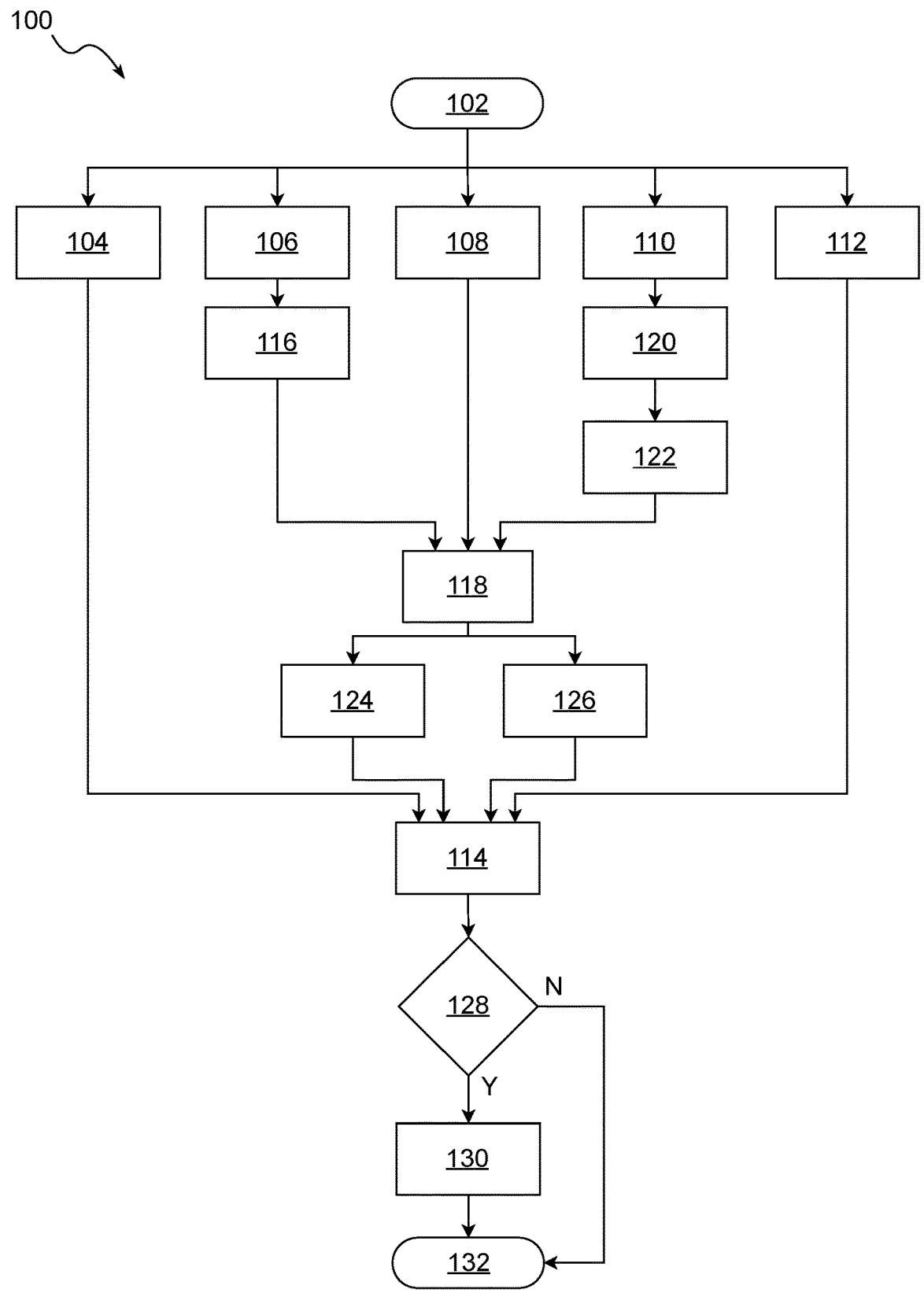
FIG. 5 is a flowchart of a method for providing information to an occupant of a vehicle according to an exemplary embodiment.

Referring to FIG. 5, a flowchart of the method for providing information to the occupant 38 of the vehicle 12 is generally indicated by reference number 100. The method 100 begins at block 102 and proceeds to blocks 104, 106, 108, 110, and 112.

At block 104, the controller 14 determines occupant and vehicle characteristics. In the scope of the present disclosure, occupant and vehicle characteristics include information about occupants of the vehicle 12 (e.g., number of occupants, age of occupants, and/or disabilities of occupants). Additionally, occupant and vehicle characteristics include information about the vehicle 12 (e.g., size of the vehicle 12, weight of the vehicle 12, and/or fuel type of the vehicle 12). Additionally, occupant and vehicle characteristics include information about a configuration of the vehicle 12 (e.g., a destination which has been entered into a navigation system of the vehicle 12). In a non-limiting example, the occupant and vehicle characteristics are determined using the vehicle sensors 16, including additional sensors such as an occupant detection system (ODS). Additionally, vehicle characteristics are stored in the media 28 of the controller 14. After block 104, the method 100 proceeds to block 114.

At block 106, the controller 14 uses the camera 32 to capture an image of the environment 30 surrounding the vehicle 12. After block 106, the method 100 proceeds to block 116.

At block 116, the controller 14 uses the image captured at block 106 to identify traffic signs and/or pavement markings. In the scope of the present disclosure, traffic signs include structures positioned along a roadway including images and/or text to provide persons using the roadway with information about rules, laws, and/or regulations of the roadway. Pavement markings include images, colors, and/or text disposed on a surface and/or curb of the roadway to provide persons using the roadway with information about rules, laws, and/or regulations of the roadway. In an exemplary embodiment, the controller 14 is programmed to identify traffic signs and/or pavement markings using a machine learning algorithm, for example, using a neural network. In a non-limiting example, the machine learning algorithm is trained by providing the algorithm with a plurality of images of traffic signs and pavement markings which have been pre-classified. For example, the images may include traffic signs and pavement markings in a variety of contexts and weather conditions. After sufficient training of the machine learning algorithm, the algorithm can identify traffic signs and/or pavement markings with a high accuracy and precision. After block 116, the method 100 proceeds to block 118.

At block 108, the controller 14 receives a first signal from an infrastructure device (not shown) in the environment 30 surrounding the vehicle 12. In the scope of the present disclosure, the infrastructure device includes, for example, a traffic sign equipped with a controller and transmission capabilities, a traffic camera, a traffic signal, and/or the like. The first signal from the infrastructure device includes information about a driving rule, as will be discussed in greater detail in reference to block 118 below. After block 108, the method 100 proceeds to block 118.

At block 110, the controller 14 determines a geographical location of the vehicle 12 using the GPS 36. After block 110, the method 100 proceeds to block 120.

At block 120, the controller 14 transmits the geographical location of the vehicle 12 determined at block 110 to a remote system (not shown) using the vehicle communication system 34. In the scope of the present disclosure, the remote system includes, for example, a server computer connected using an internet connection. After block 120, the method 100 proceeds to block 122.

At block 122, the controller 14 receives a second signal transmitted by the remote system using the vehicle communication system 34. In an exemplary embodiment, the remote signal includes information about a driving rule, as will be discussed in greater detail in reference to block 118 below. After block 122, the method 100 proceeds to block 118.

At block 112, the controller 14 determines a current date and time. In an exemplary embodiment, the controller 14 includes a real-time clock (RTC), and thus determines the current date and time using the RTC. In another exemplary embodiment, the controller 14 uses the vehicle communication system 34 to send a request to a remote system, for example, a time server, using the Network Time Protocol (NTP), thus determining the current date and time using a wireless connection between the vehicle communication system 34 and a remote system. It should be understood that various additional methods of determining the current date and time and included in the scope of the present disclosure. After block 112, the method 100 proceeds to block 114.

At block 118, at least one driving rule associated with at least one portion of the environment 30 surrounding the vehicle 12 is identified. In the scope of the present disclosure, the driving rule includes a rule, law, ordinance, or the like which applies to a specific roadway, section of roadway, lane, parking area, or the like. In a non-limiting example, a driving rule includes a designation of a parking space as a "handicap" or "disability" parking space. In another non-limiting example, a driving rule includes a traffic sign with the words "no turn on red." In yet another non-limiting example, a designation of an area as "no parking" is a driving rule.

The driving rule additionally may include applicability restrictions and an applicability time-window. In the scope of the present disclosure, an applicability restriction is a qualification on the driving rule which describes in what situations the driving rule applies. An applicability time-window describes a set of dates and/or times during which the driving rule applies. In a non-limiting example, a driving rule including an applicability restriction states, "parking for customers only." Thus, the driving rule can be interpreted as "no parking," and the applicability rule can be interpreted as "for non-customers." In another non-limiting example, a driving rule including an applicability time-window states, "no parking 8a-4p". The driving rule can be interpreted as "no parking," and the applicability time-window can be interpreted as "between 8 AM and 4 PM".

Block 118 receives the results of blocks 108, 116, and 122 as discussed above. Using at least one of the results from blocks 108, 116, and 122, the controller 14 identifies at least one driving rule. For example, the result from block 116 contains an image of a traffic sign and/or pavement marking. Therefore, in an exemplary embodiment, at block 118, the controller 14 uses a machine learning algorithm (similar to the algorithm described above in reference to block 116) to determine at least one driving rule from the image. In another example, the first signal received at block 108 includes a driving rule, as described above. In another example, the second signal received at block 122 includes a driving rule, as described above.

At block 118, the controller 14 may use any subset of the results from blocks 108, 116, and 122 to determine the driving rule. In an exemplary embodiment, the controller 14 preferentially uses the results from block 116 and uses the results from blocks 108 and 122 only as confirmation. In another exemplary embodiment, results from each of blocks 108, 116, and 122 are synthesized and used in combination at block 118 to determine the at least one driving rule. After block 118, the method 100 proceeds to blocks 124 and 126.

At block 124, the controller 14 determines at least one applicability restriction (as defined above) from the driving rule determined at block 118. After block 124, the method 100 proceeds to block 114.

At block 126, the controller 14 determines at least one applicability time-window (as defined above) from the driving rule determined at block 118. After block 126, the method 100 proceeds to block 114.

At block 114, the controller 14 compares the occupant and vehicle characteristics determined at block 104 to the applicability restrictions determined at block 124. Additionally, at block 114, the controller 14 compares the current date and time determined at block 112 to the applicability time-window determined at block 126. After block 114, the method 100 proceeds to block 128.

At block 128, the controller 14 determines an applicability state (i.e., applicable or non-applicable) of the driving rule determined at block 118. If the occupant and vehicle characteristics determined at block 104 are substantially similar to the applicability restrictions determined at block 124 and the current date and time determined at block 112 is within the applicability time-window determined at block 126, the driving rule identified at block 118 is determined to be applicable, and the method 100 proceeds to block 130. If either the occupant and vehicle characteristics determined at block 104 are not substantially similar to the applicability restrictions determined at block 124 or the current date and time determined at block 112 is not within the applicability time-window determined at block 126, the driving rule identified at block 118 is determined to be non-applicable, and the method 100 proceeds to enter a standby state at block 132. In the scope of the present disclosure, substantially similar means that the occupant and vehicle characteristics are the same as, synonymous with, or within a predetermined acceptable range (e.g., ten percent) of the applicability restrictions.

At block 130, the controller 14 uses the AR-HUD system 18, the TWD system 20, and/or the HMI 22 to display a graphic as described above in reference to FIGS. 1 through 4. Exemplary graphics will be discussed below in reference to FIGS. 6A and 6B.

In an exemplary embodiment, the controller 14 may repeatedly exit the standby state 132 and restart the method 100 at block 102. In a non-limiting example, the controller 14 may exit the standby state 132 and restart the method 100 on a timer, for example, every three hundred milliseconds. By repeatedly performing the method 100, the displayed graphics are updated to account for motion of the vehicle 12.

Figure 6A:
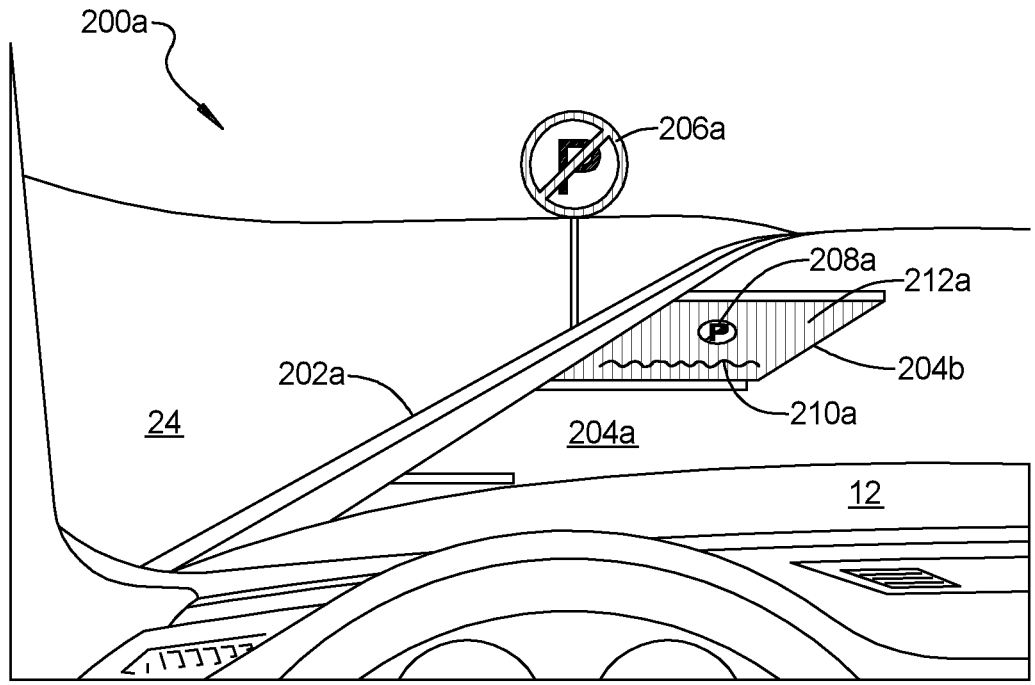
FIG. 6A is a first exemplary driving scene including a traffic sign and a plurality of parking spaces according to an exemplary embodiment.

Referring to FIG. 6A, a first exemplary driving scene is illustrated and generally indicated by reference number 200a. The first exemplary driving scene 200a depicts a view from a perspective of the occupant 38 through the windscreen 24 of the vehicle 12. The first exemplary driving scene 200a includes a curb 202a and a plurality of parking spaces 204a, 204b (i.e., a vehicle parking area). A traffic sign 206a is located adjacent to the parking space 204b. The traffic sign 206a includes an image conveying that parking is not allowed in the parking space 204b (i.e., a parking rule). The system 10 and method 100 are used to generate and display a first graphic, which is overlayed on the parking space 204b. In the exemplary embodiment depicted in FIG. 6A, the first graphic includes an image 208a, text 210a, and a red overlay 212a. Therefore, the system 10 and method 100 help to increase occupant awareness of the environment 30 surrounding the vehicle 12. For example, an applicability time-window may be on the traffic sign 206a. Accordingly, the first graphic is only displayed when the current date and time is within the applicability time-window, as discussed above.

Figure 6B:
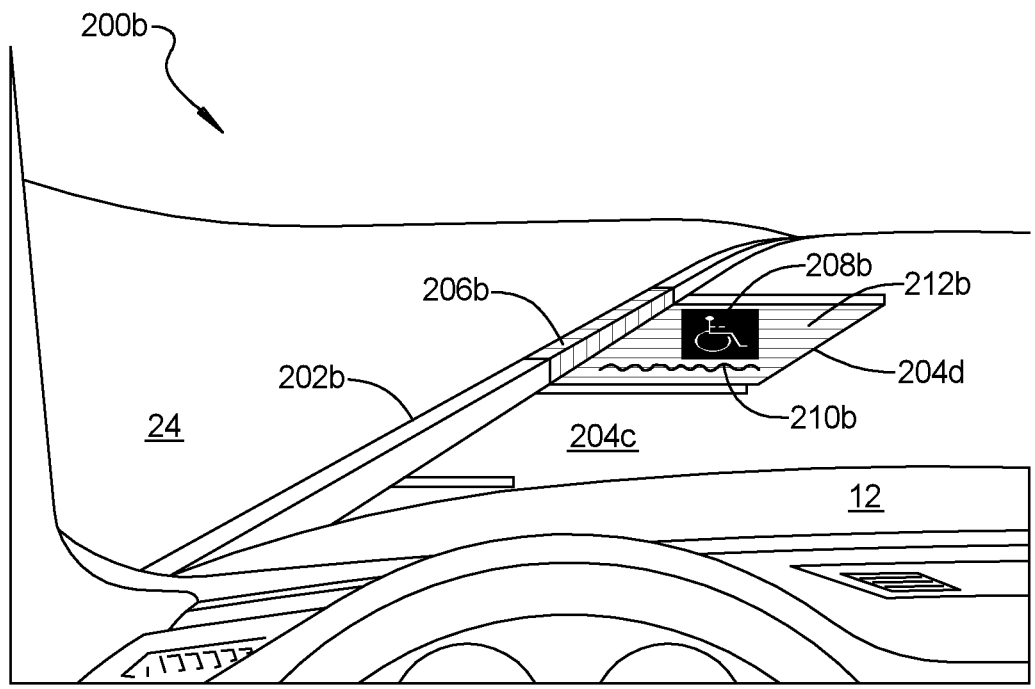
FIG. 6B is a second exemplary driving scene including a pavement marking and a plurality of parking spaces according to an exemplary embodiment.

Referring to FIG. 6B, a second exemplary driving scene is illustrated and generally indicated by reference number 200b. The second exemplary driving scene 200b depicts a view from a perspective of the occupant 38 through the windscreen 24 of the vehicle 12. The second exemplary driving scene 200b includes a curb 202b and a plurality of parking spaces 204c, 204d (i.e., a vehicle parking area). A pavement marking 206b is located on the curb 202b adjacent to the parking space 204d. The pavement marking 206b includes a blue color indicating that parking is allowed only for disabled persons in the parking space 204d (i.e., a parking rule). The system 10 and method 100 are used to generate and display a second graphic which is overlayed on the parking space 204d. In the exemplary embodiment depicted in FIG. 6B, the second graphic includes an image 208b, text 210b, and a blue overlay 212b. Therefore, the system 10 and method 100 help to increase occupant awareness of the environment 30 surrounding the vehicle 12. For example, occupants with color-deficient vision may be unable to distinguish the color of the pavement marking 206b. By providing the image 208b and text 210b, the system 10 and method 100 are used to improve awareness of the environment 30 for an occupant with color-deficient vision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing information to an occupant of a vehicle, the system comprising:
    at least one vehicle sensor for determining information about an environment surrounding the vehicle;
    a display for providing information to the occupant; and
    a controller in electrical communication with the at least one vehicle sensor and the display, wherein the controller is programmed to:
        identify at least one driving rule associated with at least one portion of the environment surrounding the vehicle using the at least one vehicle sensor;
        identify an applicability time-window of the at least one driving rule;
        determine a current date and time;
        compare the current date and time to the applicability time-window;
        identify at least one applicability restriction of the at least one driving rule, wherein the at least one applicability restriction includes a qualification on the at least one driving rule which describes in what situations the driving rule applies;
        determine a plurality of occupant characteristics and a plurality of vehicle characteristics;
        compare the plurality of occupant characteristics and the plurality of vehicle characteristics with the at least one applicability restriction;
        determine an applicability state of the at least one driving rule to be an applicable state in response to determining that the current time is within the applicability time-window and that at least one of the plurality of occupant characteristics and the plurality of vehicle characteristics is substantially similar to the at least one applicability restriction; and display a graphic using the display in response to determining that the applicability state of the at least one driving rule is the applicable state.

2. The system of claim 1, wherein the at least one vehicle sensor further comprises a camera for capturing images of the environment surrounding the vehicle, and wherein to identify the at least one driving rule associated with the at least one portion of the environment surrounding the vehicle the controller is further programmed to:

capture an image of the environment surrounding the vehicle using the camera; and analyze the image to identify the at least one driving rule associated with the at least one portion of the environment surrounding the vehicle.

3. The system of claim 2, wherein to analyze the image, the controller is further programmed to:

identify at least one traffic sign in the image;
identify at least one pavement marking in the image; and
identify the at least one driving rule based on at least one of: the at least one traffic sign and the at least one pavement marking.

4. The system of claim 3, wherein to identify the applicability time-window, the controller is further programmed to:

identify the applicability time-window based on at least one of: the at least one traffic sign and the at least one pavement marking.

5. The system of claim 3, wherein to identify the at least one applicability restriction, the controller is further programmed to:

identify the at least one applicability restriction based on least one of: the at least one traffic sign and the at least one pavement marking.

6. The system of claim 1, wherein the at least one vehicle sensor further comprises a vehicle communication system, and wherein to identify the at least one driving rule associated with the at least one portion of the environment surrounding the vehicle the controller is further programmed to:

receive a first signal transmitted by an infrastructure device in the environment surrounding the vehicle using the vehicle communication system, wherein the first signal includes information about the at least one driving rule; and identify the at least one driving rule based on the first signal.

7. The system of claim 6, wherein the at least one vehicle sensor further comprises a global positioning system (GPS), and wherein to identify the at least one driving rule associated with the at least one portion of the environment surrounding the vehicle the controller is further programmed to:

determine a location of the vehicle using the GPS;
transmit the location of the vehicle to a remote system using the vehicle communication system;
receive a second signal transmitted by the remote system using the vehicle communication system, wherein the second signal includes information about the at least one driving rule; and
identify the at least one driving rule based on the second signal.

8. The system of claim 7, wherein at least one of the first signal and the second signal further includes an applicability time-window and at least one applicability restriction of the at least one driving rule, and wherein to determine the applicability state of the at least one driving rule, the controller is further programmed to:

identify the applicability time-window based at least one of: the first signal and the second signal;
identify the at least one applicability restriction based on at least one of: the first signal and the second signal;
determine a current date and time;
compare the current date and time to the applicability time-window;
determine a plurality of occupant and vehicle characteristics;
compare the plurality of occupant and vehicle characteristics with the at least one applicability restriction; and
determine the applicability state of the at least one driving rule to be the applicable state in response to determining that the current time is within the applicability time-window and that at least one of the plurality of occupant and vehicle characteristics is substantially similar to the at least one applicability restriction.

9. The system of claim 1, wherein the display is an augmented reality head-up display (AR-HUD) system in electronic communication with the controller, wherein the AR-HUD system includes an occupant position tracking device and an AR-HUD projector, and wherein to display the graphic the controller is further programmed to:

determine a position of an occupant of the vehicle using the occupant position tracking device;
calculate a size, shape, and location of the graphic based on the position of the occupant and an image of the environment; and
display the graphic including information about the at least one driving rule on a windscreen of the vehicle using the AR-HUD system based on the size, shape, and location of the graphic.

10. The system of claim 9, wherein the display further includes a transparent windscreen display (TWD) system in electronic communication with the controller, wherein the TWD system includes transparent phosphors embedded in the windscreen of the vehicle and a TWD projector, and wherein to display the graphic the controller is further programmed to:

calculate a size, shape, and location of the graphic based on an image of the environment; and
display the graphic including information about the at least one driving rule on the windscreen of the vehicle using the TWD system based on the size, shape, and location of the graphic.

11. A method for providing information to an occupant of a vehicle, the method comprising:

identifying at least one driving rule associated with an environment surrounding the vehicle using at least one vehicle sensor;
identifying an applicability time-window associated with the at least one driving rule;
identifying at least one applicability restriction associated with the at least one driving rule;
determining a plurality of occupant characteristics and a plurality of vehicle characteristics;
determining an applicability state of the at least one driving rule based at least in part on the applicability time-window, the at least one applicability restriction, the plurality of occupant characteristics, and the plurality of vehicle characteristics, wherein the applicability state includes an applicable state and a non-applicable state; and displaying a graphic using a display in response to determining that the applicability state of the at least one driving rule is the applicable state.

12. The method of claim 11, wherein the at least one vehicle sensor is a camera, and wherein identifying the at least one driving rule further comprises:
   capturing an image of the environment surrounding the vehicle using the camera;
   identifying at least one traffic sign in the image;
   identifying at least one pavement marking in the image; and
   identifying the at least one driving rule based on at least one of: the at least one traffic sign and the at least one pavement marking.

13. The method of claim 12, wherein determining the applicability state of the at least one driving rule further comprises:
   identifying the applicability time-window based on at least one of: the at least one traffic sign and the at least one pavement marking;
   identifying the at least one applicability restriction based on at least one of: the at least one traffic sign and the at least one pavement marking;
   determining a current date and time;
   comparing the current date and time to the applicability time-window;
   comparing the plurality of occupant and vehicle characteristics with the at least one applicability restriction; and
   determining the applicability state of the at least one driving rule to be the applicable state in response to determining that the current time is within the applicability time-window and that at least one of the plurality of occupant and vehicle characteristics is substantially similar to the at least one applicability restriction.

14. The method of claim 11, wherein the at least one vehicle sensor is a vehicle communication system, and wherein identifying the at least one driving rule further comprises:
   receiving a first signal transmitted by an infrastructure device in the environment surrounding the vehicle using the vehicle communication system, wherein the first signal includes information about the at least one driving rule; and
   identifying the at least one driving rule based on the first signal.

15. The method of claim 14, wherein the at least one vehicle sensor further comprises a global positioning system (GPS), and wherein identifying the at least one driving rule further comprises:
   determining a location of the vehicle using the GPS;
   transmitting the location of the vehicle to a remote system using the vehicle communication system;
   receiving a second signal transmitted by the remote system using the vehicle communication system, wherein the second signal includes information about the at least one driving rule; and
   identifying the at least one driving rule based on the second signal.

16. The method of claim 15, wherein the at least one of the first signal and the second signal further includes an applicability time-window and at least one applicability restriction of the at least one driving rule, and determining the applicability state of the at least one driving rule further comprises:
   identifying an applicability time-window based at least one of: the first signal and the second signal;
   identifying at least one applicability restriction based on at least one of: the first signal and the second signal;
   determining a current date and time;
   comparing the current date and time to the applicability time-window;
   determining a plurality of occupant and vehicle characteristics;
   comparing the plurality of occupant and vehicle characteristics with the at least one applicability restriction; and
   determining the applicability state of the at least one driving rule to be the applicable state in response to determining that the current time is within the applicability time-window and that at least one of the plurality of occupant and vehicle characteristics is substantially similar to the at least one applicability restriction.

17. The method of claim 11, wherein the display is an augmented reality head-up display (AR-HUD) system, wherein the AR-HUD system includes an occupant position tracking device and an AR-HUD projector, and wherein displaying the graphic further comprises:
   determining a position of an occupant of the vehicle using the occupant position tracking device;
   calculating a size, shape, and location of the graphic based on the position of the occupant and an image of the environment; and
   displaying the graphic including information about the at least one driving rule on a windscreen of the vehicle using the AR-HUD system based on the size, shape, and location of the graphic.

18. A system for providing information to an occupant of a vehicle, the system comprising:
   a plurality of vehicle sensors including:
      a camera for capturing images of an environment surrounding the vehicle;
      a vehicle communication system for communicating with systems external to the vehicle; and
      a global positioning system (GPS) for determining a geographical location of the vehicle;
   a display including:
      an augmented reality head-up display (AR-HUD) system; and
      a transparent windscreen display (TWD) system; and
   a controller in electrical communication with the plurality of vehicle sensors and the display, wherein the controller is programmed to:
      identify at least one driving rule associated with at least one portion of the environment surrounding the vehicle using the plurality of vehicle sensors;
      identify an applicability time-window associated with the at least one driving rule;
      identify at least one applicability restriction associated with the at least one driving rule;
      determine a plurality of occupant characteristics and a plurality of vehicle characteristics;
      determine an applicability state of the at least one driving rule based at least in part on the applicability time-window, the at least one applicability restriction, the plurality of occupant characteristics, and the plurality of vehicle characteristics, wherein the applicability state includes an applicable state and a non-applicable state; and display a graphic using the display in response to determining that the applicability state of the at least one driving rule is the applicable state.

19. The system of claim 18, wherein:
to identify the at least one driving rule, the controller is further programmed to:
    capture an image of the environment surrounding the vehicle using the camera;
    identify at least one traffic sign in the image;
    identify at least one pavement marking in the image; and
    identify the at least one driving rule based on at least one of: the at least one traffic sign and the at least one pavement marking; and
to determine the applicability state of the at least one driving rule, the controller is further programmed to:
    identify the applicability time-window based on at least one of: the at least one traffic sign and the at least one pavement marking;
    identify the at least one applicability restriction based on at least one of: the at least one traffic sign and the at least one pavement marking;
    determine a current date and time;
    compare the current date and time to the applicability time-window;
    compare the plurality of occupant and vehicle characteristics with the at least one applicability restriction; and
    determine the applicability state of the at least one driving rule to be the applicable state in response to determining that the current time is within the applicability time-window and that at least one of the plurality of occupant and vehicle characteristics is substantially similar to the at least one applicability restriction.

20. The system of claim 18, wherein:
to identify the at least one driving rule, the controller is further programmed to:
    determine a location of the vehicle using the GPS;
    transmit the location of the vehicle to a remote system using the vehicle communication system;
    receive a signal transmitted by the remote system using the vehicle communication system, wherein the signal includes information about the at least one driving rule; and
    identify the at least one driving rule based on the signal; and
to determine the applicability state of the at least one driving rule, the controller is further programmed to:
    identify the applicability time-window based on the signal;
    identify the at least one applicability restriction based on the signal;
    determine a current date and time;
    compare the current date and time to the applicability time-window;
    compare the plurality of occupant and vehicle characteristics with the at least one applicability restriction; and
    determine the applicability state of the at least one driving rule to be the applicable state in response to determining that the current time is within the applicability time-window and that at least one of the plurality of occupant and vehicle characteristics is substantially similar to the at least one applicability restriction.

* * * * *